US009578663B2

(12) United States Patent
Yi et al.

(10) Patent No.: US 9,578,663 B2
(45) Date of Patent: Feb. 21, 2017

(54) METHOD AND APPARATUS FOR SETTING UP LINK AT HIGH-SPEED IN WIRELESS COMMUNICATION SYSTEM

(71) Applicant: LG ELECTRONICS INC., Seoul (KR)

(72) Inventors: Yunjung Yi, Anyang-si (KR); Eunsun Kim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 56 days.

(21) Appl. No.: 14/357,749

(22) PCT Filed: Dec. 10, 2012

(86) PCT No.: PCT/KR2012/010703
§ 371 (c)(1),
(2) Date: May 12, 2014

(87) PCT Pub. No.: WO2013/085366
PCT Pub. Date: Jun. 13, 2013

(65) Prior Publication Data
US 2014/0347985 A1    Nov. 27, 2014

Related U.S. Application Data

(60) Provisional application No. 61/568,620, filed on Dec. 8, 2011.

(51) Int. Cl.
*H04W 76/02* (2009.01)
*H04W 28/02* (2009.01)
(Continued)

(52) U.S. Cl.
CPC ......... *H04W 76/02* (2013.01); *H04W 28/0289* (2013.01); *H04W 28/20* (2013.01); *H04W 84/12* (2013.01)

(58) Field of Classification Search
None
See application file for complete search history.

(56) References Cited

U.S. PATENT DOCUMENTS

| 7,706,326 B2* | 4/2010 | Marinier | H04W 28/18 |
| | | | 370/331 |
| 2004/0181692 A1* | 9/2004 | Wild | H04W 48/14 |
| | | | 726/4 |

(Continued)

FOREIGN PATENT DOCUMENTS

EP    2093940    8/2009

OTHER PUBLICATIONS

PCT International Application No. PCT/KR2012/010703, Written Opinion of the International Searching Authority dated Mar. 25, 2013, 14 pages.

(Continued)

*Primary Examiner* — Candal Elpenord
(74) *Attorney, Agent, or Firm* — Lee Hong Degerman Kang Waimey

(57) ABSTRACT

Disclosed are a method and an apparatus for setting up a session at a high speed in a WLAN system or a LAN LTE system. A method for a station (STA) setting up a link at a high speed in a wireless communication system, according to one embodiment of the present invention, comprises the steps of: transmitting a request frame comprising information related to bandwidth requested by the STA to an access point (AP); and receiving from the AP a response frame, which is decided on the basis of the information related to the bandwidth that is requested, comprising information indicating whether to accommodate the request.

9 Claims, 11 Drawing Sheets

(51) Int. Cl.
*H04W 28/20* (2009.01)
*H04W 84/12* (2009.01)

(56) References Cited

U.S. PATENT DOCUMENTS

| | | | |
|---|---|---|---|
| 2005/0213579 A1* | 9/2005 | Iyer | H04L 63/1441 370/395.2 |
| 2006/0062183 A1* | 3/2006 | Forte | H04W 36/0016 370/331 |
| 2006/0209876 A1* | 9/2006 | Liu | H04B 7/0695 370/445 |
| 2007/0237125 A1 | 10/2007 | Ohuchi | |
| 2007/0291719 A1 | 12/2007 | Demirhan et al. | |
| 2008/0068991 A1* | 3/2008 | Ponauswamy | H04W 28/24 370/230 |
| 2008/0170497 A1* | 7/2008 | Jeong | H04W 28/08 370/230 |
| 2009/0075653 A1* | 3/2009 | Yeom | H04W 72/02 455/434 |
| 2010/0097932 A1 | 4/2010 | Wu | |
| 2011/0110340 A1* | 5/2011 | Lakkis | H04W 74/08 370/336 |
| 2012/0287783 A1* | 11/2012 | Kuhn | H04W 16/08 370/230 |
| 2013/0042301 A1* | 2/2013 | Mahamuni | H04W 12/06 726/3 |

OTHER PUBLICATIONS

PCT International Application No. PCT/KR2012/010703, Written Opinion of the International Searching Authority dated Mar. 25, 2013, 11 pages.

\* cited by examiner

METHOD AND APPARATUS FOR SETTING UP LINK AT HIGH-SPEED IN WIRELESS COMMUNICATION SYSTEM

CROSS-REFERENCE TO RALATED APPLICATIONS

This application is the National Stage filing under 35 U.S.C. 371 of International Application No. PCT/KR2012/010703, filed on Dec. 10, 2012, which claims the benefit of U.S. Provisional Application Ser. No. 61/586,620, filed on Dec. 8, 2011, the contents of which are all hereby incorporated by reference herein in their entirety.

TECHNICAL FIELD

The present invention relates to a wireless communication system, and more particularly, to a method and apparatus for performing fast link setup in a wireless LAN (WLAN) or a local network (LAN LTE) system.

BACKGROUND ART

Standards for Wireless Local Area Network (WLAN) technology have been developed as Institute of Electrical and Electronics Engineers (IEEE) 802.11 specifications. IEEE 802.11a and 802.11b use an unlicensed band at 2.4 GHz or 5 GHz. IEEE 802.11b provides a transmission rate of 11 Mbps and IEEE 802.11a provides a transmission rate of 54 Mbps. IEEE 802.11g applies Orthogonal Frequency-Division Multiplexing (OFDM) at 2.4 GHz to provide a transmission rate of 54 Mbps. IEEE 802.11n may use Multiple Input Multiple Output (MIMO)-OFDM, and provide a transmission rate of 300 Mbps to four spatial streams. IEEE 802.11n may support a channel bandwidth up to 40 MHz to provide a transmission rate of 600 Mbps.

IEEE 802.11ai which is a new standard for supporting fast initial link setup of IEEE 802.11 stations (STAs) through an IEEE 802.11 Medium Access Control (MAC) layer has been developed. IEEE 802.11ai is intended to provide a technology for supporting link setup at a high speed in a state that huge users simultaneously access a new WLAN by leaving a wireless LAN coverage which is typically accessed by them in case of transfer of public transportation. Also, main features of IEEE 802.11ai are security framework, IP address assignment, and fast network discovery.

Also, in a 3rd Generation Partnership Project (3GPP) Long Term Evolution (LTE) or LTE-Advanced (LTE-A) system, a user equipment (UE) may perform a random access process to acquire an uplink transmission timing alignment value or perform other various purposes. For example, if the user equipment transmits a random access preamble to a base station, the base station may provide a random access response to the base station in response to the random access preamble.

DISCLOSURE

Technical Problem

As described above, if huge users attempt network connection substantially at the same time, or if huge users perform a random access process substantially at the same time, the technology for fast link setup (or fast session setup) will be required. However, a detailed method for fast link setup has not been suggested up to now.

An object of the present invention devised to solve the conventional problem is to provide a method for minimizing delay of link setup for a plurality of users through a new fast link setup process corrected from the existing link setup process.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the above technical problem, a method for a station (STA) to perform fast link setup in a wireless communication system according to one embodiment of the present invention comprises the steps of transmitting a request frame including request bandwidth related information of the STA to an access point (AP), if the STA is not associated with the AP; and receiving from the AP a response frame including information indicating whether to accept the request frame, which is determined on the basis of the request bandwidth related information.

To solve the above technical problem, a method for an access point (AP) to support fast link setup of a station (STA) in a wireless communication system according to another embodiment of the present invention comprises the steps of receiving a request frame including request bandwidth related information of the STA, if the STA is not associated with the AP; and transmitting to the STA a response frame including information indicating whether to accept the request frame, which is determined on the basis of the request bandwidth related information.

To solve the above technical problem, a station (STA) device for performing fast link setup in a wireless communication system according to still another embodiment of the present invention comprises a transceiver performing communication with an external device; and a processor controlling the STA device that includes the transceiver, wherein the processor is configured to transmit a request frame including request bandwidth related information of the STA, to an access point (AP) by using the transceiver if the STA is not associated with the AP, and to receive from the AP through the transceiver a response frame including information indicating whether to accept the request frame, which is determined on the basis of the request bandwidth related information.

To solve the above technical problem, an access point (AP) device for supporting fast link setup of a station (STA) in a wireless communication system according to further still another embodiment of the present invention comprises a transceiver performing communication with an external device; and a processor controlling the AP device that includes the transceiver, wherein the processor is configured to receive a request frame including request bandwidth related information of the STA from the STA by using the transceiver, if the STA is not associated with the AP, and to transmit to the STA by using the transceiver a response frame including information indicating whether to accept the request frame, which is determined on the basis of the request bandwidth related information.

The followings may commonly be applied to the embodiments according to the present invention.

Whether to accept the request frame may be determined by comparison between expected available capacity of the AP and the request bandwidth related information of the STA.

In this case, the expected available capacity may be updated when the request bandwidth related information is received by the AP.

The response frame may further include comeback delay information, and additional request frame may be transmitted from the STA to the AP after wait for a time indicated by the comeback delay information.

At this time, the wait time of the STA may be set to a value obtained by subtracting difference between a current time and a time when the response message is transmitted from the AP from a value of the comeback delay information.

The step of transmitting the request frame may include respectively transmitting a plurality of request frames on a plurality of channels, and the step of receiving the response frame may include respectively receiving a plurality of response frames in response to the plurality of request frames on one channel.

In this case, each of the plurality of request frames may further include information on the one channel through which the plurality of response frames are received.

Also, each of the plurality of request frames may further include information on response wait time for each of the response frames.

In this case, the response wait time may be set to a value that allows the STA to receive the plurality of response frames for a predetermined time interval.

Also, a value of the response wait time may be set to a value obtained by subtracting difference between the time when a packet is generated by a MAC layer and the time when the frame is transmitted from a physical (PHY) layer from a response wait time initial value set by the MAC layer for each of the plurality of request frames.

The plurality of request frames may be a plurality of probe request frames, and the plurality of response frames may be a plurality of probe response frames.

The request frame may be one of an authentication request frame, an association request frame or a random access preamble, and the response frame may be one of an authentication response frame, an association response frame or a random access response frame.

The random access preamble may be selected from one of a plurality of random access preamble groups classified in accordance with the request bandwidth related information of the STA. The random access response may be transmitted using a first identifier of the STA if the request frame is accepted, and may be transmitted using a second identifier of the STA if the request frame is not accepted.

The aforementioned description of the present invention and the detailed description of the present invention which will be described later are only exemplary, and are intended for additional description of claims.

Advantageous Effects

According to the present invention, a method and apparatus for minimizing delay of link setup for a plurality of users may be provided through a new fast link setup process corrected from the existing link setup process.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
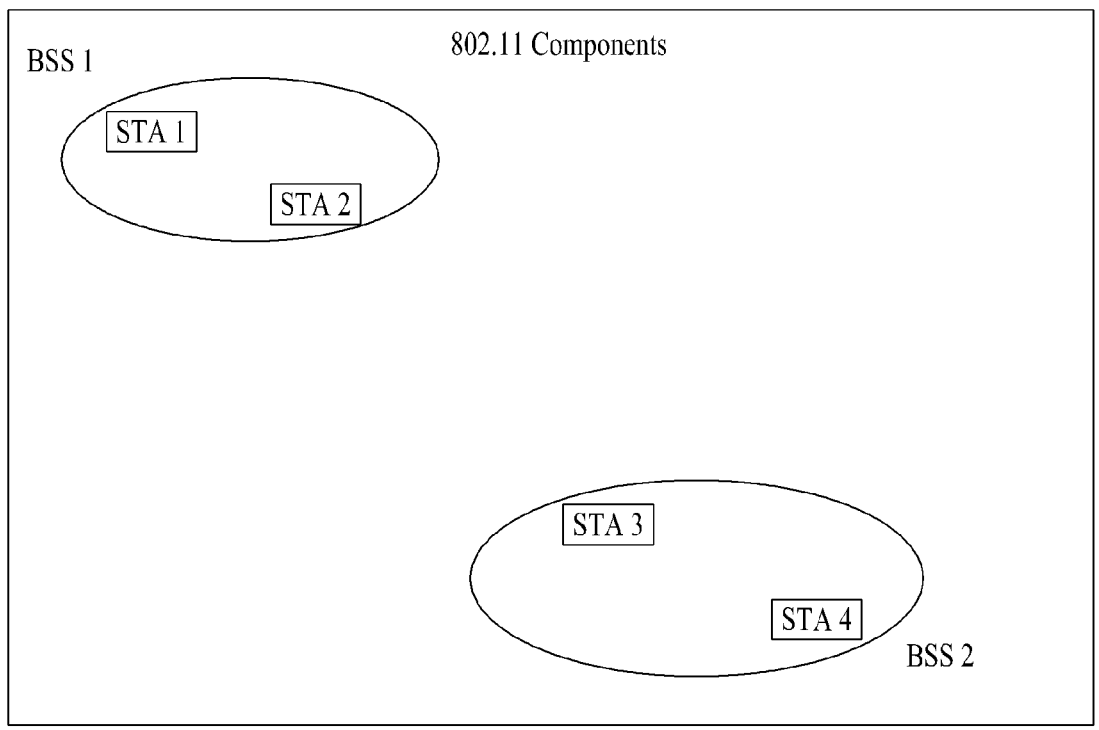
FIG. 1 is a diagram illustrating an exemplary structure of an IEEE 802.11 system to which the present invention may be applied.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE and the 3GPP LTE-A system.

FIG. 1 is a diagram illustrating an exemplary structure of an IEEE 802.11 system to which the present invention may be applied.

The IEEE 802.11 structure may include a plurality of elements, and WLAN that supports transparent STA mobility may be provided to upper layers by interaction among the plurality of elements. A basic service set (BSS) may correspond to a basic element block in IEEE 802.11 LAN. FIG. 1 shows two BSSs BSS1 and BSS2, each of which has two STAs that are members of the BSS (STA1 and STA2 are included in the BSS1, and STA3 and STA4 are included in the BSS2). In FIG. 1, it is to be understood that an oval representing the BSS represents a coverage area where STAs included in their corresponding BSS maintain communication. This area may be referred to as a basic service area (BSA). If the STA moves out of the BSA, the STA cannot directly perform communication with the other STAs within the corresponding BSA.

The independent BSS (IBSS) is the most basic type of IEEE 802.11 LAN. For example, the IBSS may have a minimum IEEE 802.11 LAN that includes only two STAs. Also, the BSS (BSS1 or BSS2) of FIG. 1, which shows the most basic type and omits the other elements, may correspond to a main example of the IBSS. This mode of operation is possible when the STAs may directly perform communication. Since this type of IEEE 802.11 LAN is often configured without pre-planning, for only as long as the LAN is needed, this type of operation is often referred to as an ad hoc network.

Membership of the STA in the BSS may dynamically be changed by power on or off of the STA, or incoming or outgoing of the STA to or from the BSS area. To become a member of the BSS, the STA may join in the BSS by using a synchronization process. In order to access all the services based on the BSS, the STA should be associated with the BSS. This association may dynamically be configured, and may include use of a distribution system service (DSS).

Figure 2:
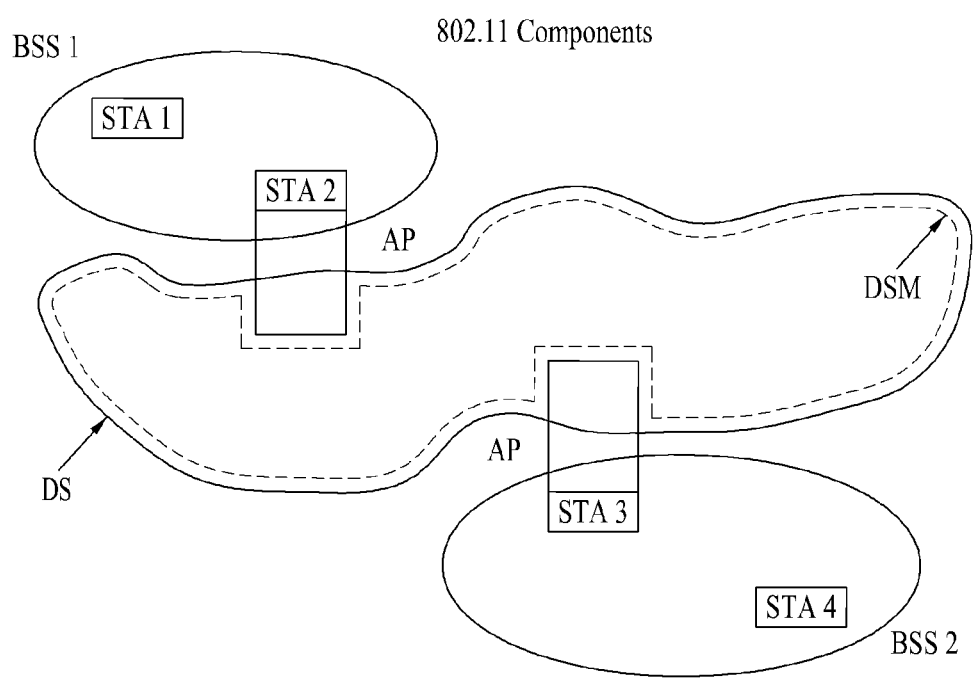
FIG. 2 is a diagram illustrating another exemplary structure of an IEEE 802.11 system to which the present invention may be applied.

FIG. 2 is a diagram illustrating another exemplary structure of an IEEE 802.11 system to which the present invention may be applied. In FIG. 2, elements of a distribution system (DS), a distribution system medium (DSM) and access point (AP) are added to the structure of FIG. 1.

The direct station-to-station distance in the LAN may be limited by PHY performance. For some networks, this distance is sufficient, whereas communication between stations far away from each other may be required as the case may be. The distribution system (DS) may be configured to support extended coverage.

The DS means a structure that the BSSs are mutually connected with one another. In more detail, the BSS may exist as shown in FIG. 1, whereas the BSS may exist as an element of extended type of a network that includes a plurality of BSSs.

The DS is a logical concept, and may be specified by features of the distribution system medium (DSM). In this regard, the IEEE 802.11 standard logically identifies the wireless medium (WM) from the distribution system medium (DSM). Each logical medium is used for different purposes, by a different component of the structure. The IEEE 802.11 definitions neither preclude, nor demand, that the multiple media be either the same or different. Recognizing that the multiple media are logically different is the key to understanding the flexibility of the IEEE 802.11 LAN structure (or DS structure or other network structure). In other words, the IEEE 802.11 LAN structure may be configured in various manners, and a corresponding LAN structure may be specified independently by the physical characteristics of any specific implementation.

The DS may support a mobile device by providing seamless integration of multiple BSSs and providing the logical services necessary to handle address to destination An access point (AP) is any entity that has STA functionality and enables associated STAs to access the DS through the WM. Data transfer may be performed between the BSS and the DS through the AP. For example, STA2 and STA3 shown in FIG. 2 have functionality of the STA and provide a function of enabling their associated STAs STA1 and STA4 to access the DS. Also, since all APs basically correspond to STAs, they are addressable entities. The addresses used by the AP for communication on the WM and on the DSM are not necessarily the same as each other.

Data sent to the AP's STA address by one of the STAs associated with it may always be received at the uncontrolled port and processed by the IEEE 802.1x port access entity. In addition, if the controlled port is authorized, transmitted data (or frame) may be transferred to the DS.

Figure 3:
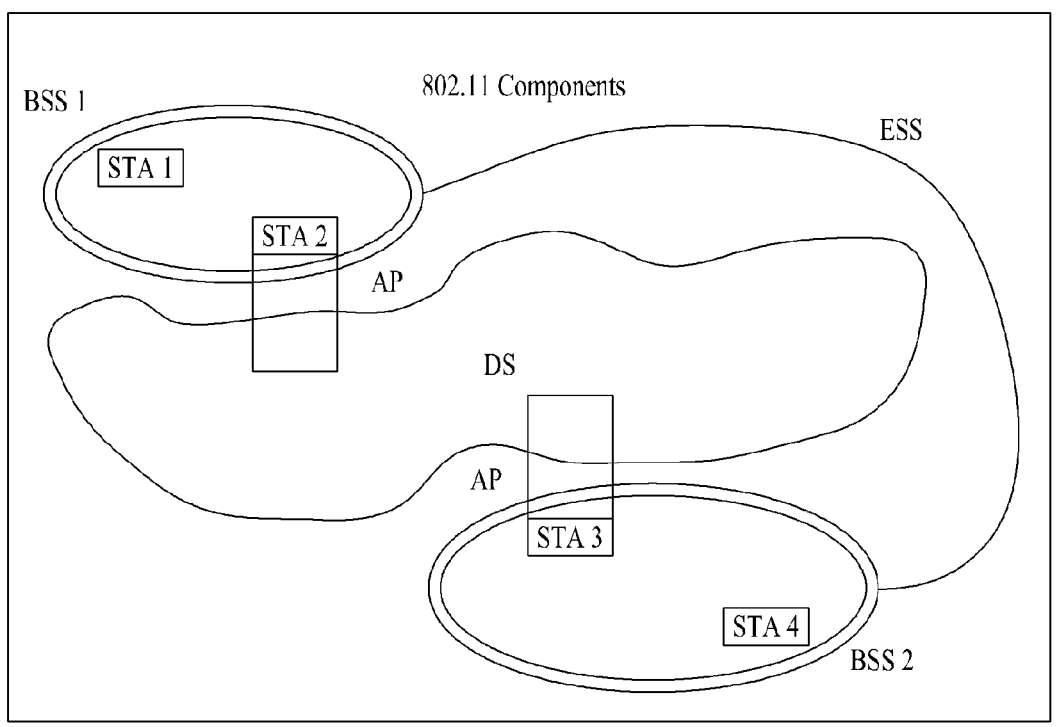
FIG. 3 is a diagram illustrating other exemplary structure of an IEEE 802.11 system to which the present invention may be applied.

FIG. 3 illustrates another exemplary structure of IEEE 802.11 system to which the present invention may be applied. FIG. 3 conceptionally illustrates an extended service set (ESS) for additionally providing extended coverage to the structure of FIG. 2.

A wireless network of arbitrary size and complexity may include a DS and BSSs. In the IEEE 802.11 system, this type of network will be referred to as the ESS network. The ESS may correspond to the union of the BSSs connected to one DS. However, the ESS does not include the DS. The key concept is that the ESS network appears to an LLC (logical link control) layer as an IBSS network. STAs included in the ESS may perform communication with one another, and mobile STAs may move from one BSS to another (within the same ESS) transparently to LLC.

Nothing is assumed by the IEEE 802.11 about the relative physical locations of the BSSs in FIG. 3. All of the following are possible. The BSSs may partially overlap. This is commonly used to provide contiguous coverage within a physical volume. Also, the BSSs could be physically disjoint. Logically there is no limit to the distance between the BSSs. The BSSs may be physically collocated. This may be done to provide redundancy. One (or more) IBSS or ESS network(s) may be physically present in the same space as one (or more) ESS network(s). This may arise for a number of reasons. Some examples are when an ad hoc network is operating in a location where an ESS network exists, when physically overlapping IEEE 802.11 networks have been set up by different organizations, and when two or more different access and security policies are needed in the same location.

Figure 4:
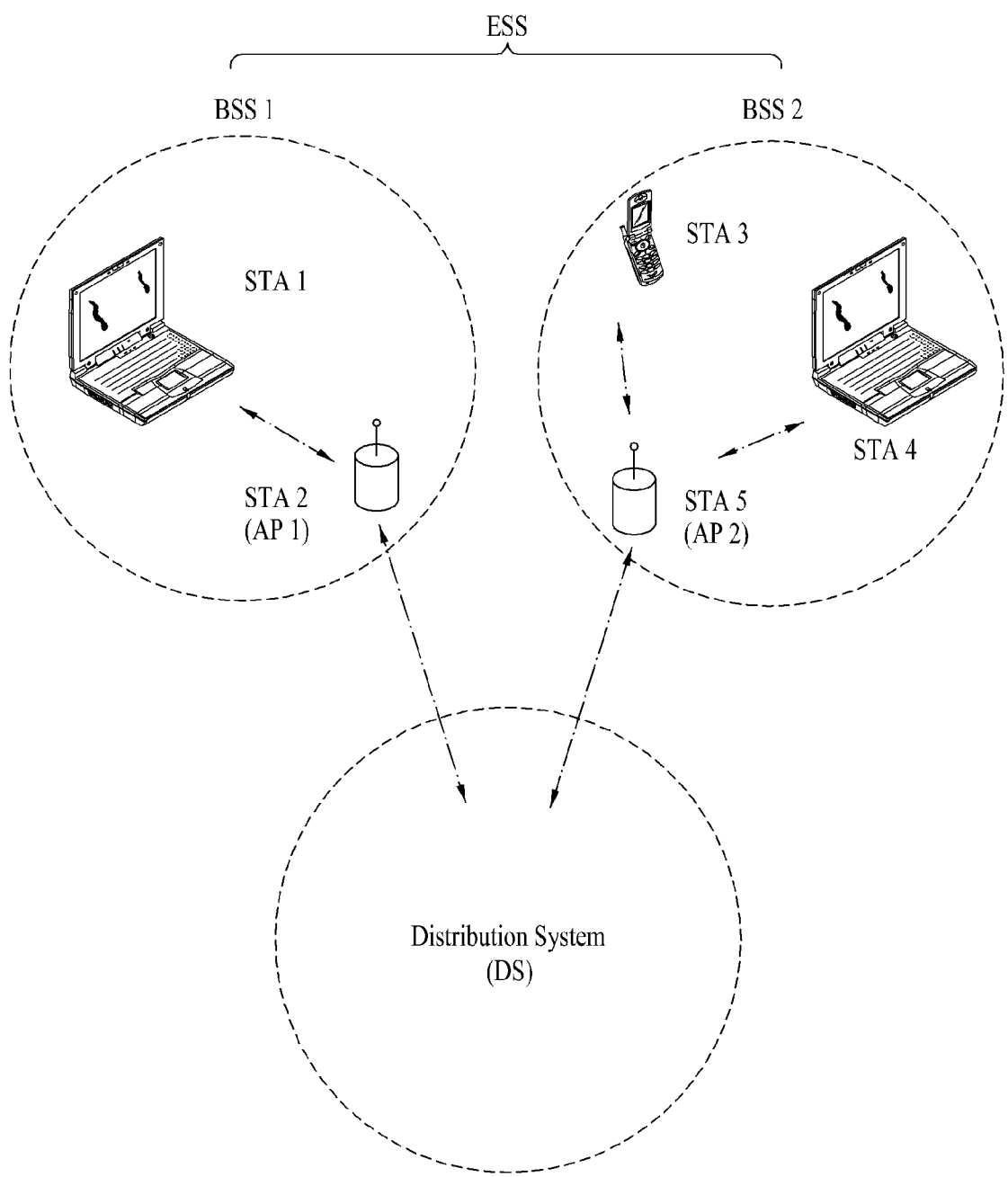
FIG. 4 is a diagram illustrating an exemplary structure of a WLAN system.

FIG. 4 is a diagram illustrating an exemplary structure of a WLAN system. FIG. 4 is an example of infrastructure BSS including DS.

In the example of FIG. 4, the ESS is configured by BSS 1 and BSS 2. In the WLAN system, the STA is a device operating according to MAC/PHY regulation of the IEEE 802.11, and includes an AP STA and non-AP STA. The non-AP STA generally corresponds to the device which a user directly handles, such as a laptop computer and a mobile phone. In the example of FIG. 4, STA1, STA3 and STA4 correspond to the non-AP STA, and STA2 and STA5 correspond to the AP STA.

In the following description, the non-AP STA may be referred to as terminal, WTRU (Wireless Transmit/Receive Unit), User Equipment (UE), Mobile Station (MS), Mobile Terminal, Mobile Subscriber Station (MSS), etc. Also, the AP corresponds to Base Station (BS), Node-B, evolved Node-B (eNB), BTS (Base Transceiver System), or Femto BS in another field of wireless communication.

Link Setup Process

Figure 5:
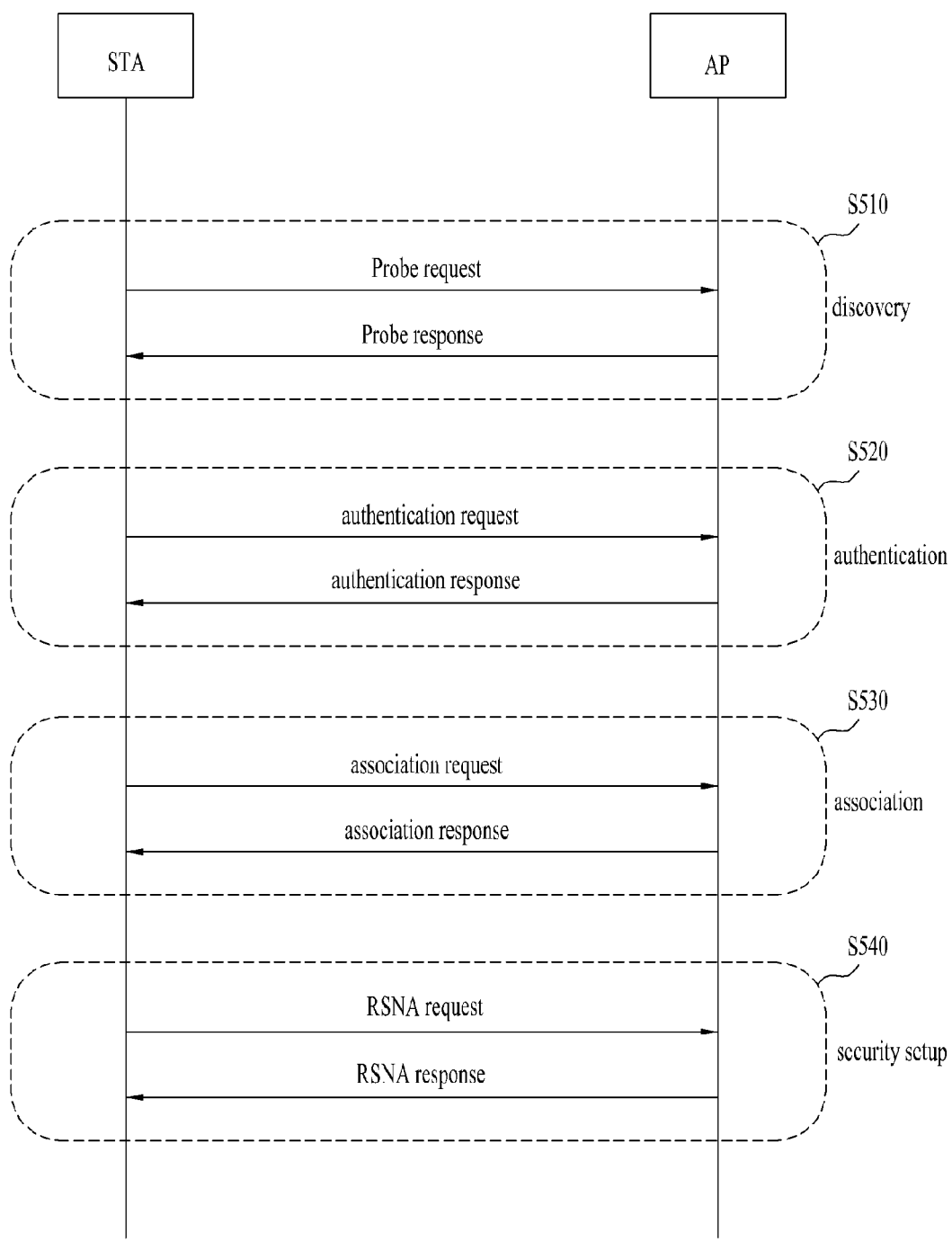
FIG. 5 is a diagram illustrating a general link setup process.

FIG. 5 is a diagram illustrating a general link setup process.

The STA should discover a network, perform authentication, establish association, and perform authentication for security to perform link setup and transmit and receive data to and from the network. The link setup process may be referred to as a session initiation process or a session setup process. Also, discovery, authentication, association and security setup of the link setup process may be referred to as an association process.

The exemplary link setup process will be described with reference to FIG. 5.

The STA may perform a network discovery operation at step S510. The network discovery operation may include a scanning operation of the STA. In other words, the STA should search for a network, which may join, to access the network. The STA should identify a network, which is compatible, before joining a wireless network, wherein a network identification process at a specific area will be referred to as scanning.

The scanning scheme may include an active scanning scheme and a passive scanning scheme.

FIG. 5 exemplarily illustrates a network discovery operation that includes an active scanning process. In the active scanning scheme, a scanning STA, which performs scanning, transmits a probe request frame to probe into an AP present nearby while moving each channel, and waits for a response to the probe request frame. In response to the probe request frame, a responder transmits a probe response frame to the STA that has transmitted the probe request frame. In this case, the responder may be an STA which has finally transmitted a beacon frame in a BSS of a channel which was being scanned. In a BSS, an AP transmits a beacon frame, so the AP can be the responder, while in an IBSS, STAs within the IBSS transmit a beacon frame by turns, so a responder cannot be fixed. For example, the STA, which has transmitted the probe request frame through a channel no. 1 and has received the probe request frame through the channel no. 1, may store BSS related information included in the received probe response frame and then move to next channel (for example, channel no. 2 to perform scanning (that is, probe request/response transmission and reception on the channel no. 2) in the same manner.

Although not shown in FIG. 5, the scanning operation may be performed in accordance with the passive scanning scheme. In the passive scanning scheme, the scanning STA waits for a beacon frame while moving each channel. The beacon frame, one of management frames in IEEE 802.11, is periodically transmitted to inform about the presence of a wireless network, allow the scanning STA to search for the wireless network to join it. In the BSS, the AP serves to periodically transmit the beacon frame. In the IBSS, the STAs within the IBSS transmit the beacon frame by turns. The scanning STA stores information on the BSS included in the beacon frame if the beacon frame is received, and records beacon frame information in each channel while moving to another channel. The STA that has received the beacon frame may store BSS related information included in the received beacon frame and move to next channel to perform scanning in the same manner.

As compared with passive scanning, active scanning is advantageous in that delay and power consumption are smaller than those of passive scanning.

After the STA discovers the network, the authentication process may be performed at step S520. This authentication process may be referred to as a first authentication process to clearly identify it from a security setup operation of step S540 which will be described later.

The authentication process includes transmitting an authentication request frame from the STA to the AP and transmitting an authentication response frame from the AP to the STA in response to the authentication request frame. An authentication frame used for authentication request/response corresponds to a management frame, and may include information as illustrated in Table 1 below.

TABLE 1

| Order | Information | Notes |
|---|---|---|
| 1 | Authentication algorithm number | |
| 2 | Authentication transaction sequence number | |
| 3 | Status code | The status code information is reserved in certain Authentication frames. |
| 4 | Challenge text | The challenge text element is present only in certain Authentication frames. |
| 5 | RSN | The RSNE is present in the FT Authentication frames. |
| 6 | Mobility Domain | The MDE is present in the FT Authentication frames. |
| 7 | Fast BSS Transition | An FTE is present in the FT Authentication frames. |
| 8 | Timeout Interval (reassociation deadline) | A Timeout Interval element (TIE) containing the reassociation deadline interval is present in the FT Authentication frames. |
| 9 | RIC | A Resource Information Container, containing a variable number of elements, is present in the FT Authentication frames. |
| 10 | Finite Cyclic Group | An unsigned integer indicating a finite cyclic group. This is present in SAE authentication frames |
| 11 | Anti-Clogging Token | A random bit-string used for anti-clogging purposes. This is present in SAE authentication frames. |
| 12 | Send-Confirm | A binary encoding of an integer used for anti-replay purposes. This is present in SAE authentication frames |
| 13 | Scalar | An unsigned integer encoded. This is present in SAE authentication frames |
| 14 | Element | A field element from a finite field encoded. This is present in SAE authentication frames |
| 15 | Confirm | An unsigned integer encoded. This is present in SAE authentication frames |
| Last | Vendor Specific | One or more vendor-specific elements are optionally present. These elements follow all other elements. |

In Table 1, an authentication algorithm number field indicates a single authentication algorithm, and has a length of 2 octet. For example, a value of 0 of the authentication algorithm number field indicates an open system, a value of 1 thereof indicates a shared key, a value of 2 thereof indicates fast BSS transition, and a value of 3 thereof indicates simultaneous authentication of equals (SAE).

An authentication transaction sequence number field indicates a current status of transaction (or processing) of a plurality of steps, and has a length of 2 octet.

A status code field is used for a response frame, indicates success or failure of a requested operation (for example, authentication request), and has a length of 2 octet.

A challenge text field includes a challenge text at authentication exchange, and its length is determined in accordance with the authentication algorithm and the transaction sequence number.

A Robust Security Network (RSN) field includes cipher related information, and has a length of maximum 255 octet. This RSN element (RSNE) is included in a Fast BSS Transition (FT) authentication frame. A mobility domain field includes a mobility domain identifier (MD ID) and an FT capability and policy field, and may be used by the AP to advertise an AP group (set of APs constituting mobility domain) which includes the corresponding AP. The fast BSS transition field includes information required to perform FT authentication sequence during fast BSS transition at the RSN. A timeout interval field includes a reassociation deadline interval. A resource information container (RIC) field means a set of one or more elements related to resource request/response, and may include a variable number of elements (that is, elements indicating resources).

A finite cyclic group field indicates a cryptographic group used for SAE exchange, and has an unsigned integer value indicating the finite cyclic group. An Anti-Clogging Token field is used for SAE authentication for protecting denial-of-service, and includes random bit streams. A Send-Confirm field is used for response prevention in case of SAE authentication, and has a binary coded integer value. A Scalar field is used to transmit and receive cipher related information during SAE authentication, and has an unsigned integer value which is encoded. An element field is used to transmit and receive elements of the finite field during SAE authentication. A Confirm field is used to approve possession of a cipher key during SAE authentication, and has an unsigned inter value which is encoded.

A Vendor Specific field may be used for vendor-specific information which is not defined in the IEEE 802.11 standard.

Table 1 illustrates a partial example of information that may be included in authentication request/response frames, and additional information may be included therein.

The STA may transmit, for example, an authentication request frame, which includes one or more fields in Table 1, to the AP. The AP may determine whether to grant authentication for the corresponding STA on the basis of the information included in the received authentication request frame. The AP may provide the result of the authentication process to the STA, for example, through the authentication response frame that includes one or more fields in Table 1.

After the STA is successfully authenticated, the association process may be performed at step S530. The association process includes transmitting an association request frame from the STA to the AP, and transmitting an association response frame from the AP to the STA in response to the association request frame.

For example, the association request frame may include information related to various capabilities, a beacon listen interval, service set identifier (SSID), supported rates, supported channels, RSN, mobility domain, supported operating classes, traffic indication map (TIM) broadcast request, and information on interworking service capability.

For example, the association response frame may include information related to various capabilities, a status code, association ID (AID), supported rates, enhanced distributed channel access (EDCA), parameter set, received channel power indicator (RCPI), received signal to noise indicator (RSNI), mobility domain, timeout interval (association comeback time)), overlapping BSS scan parameter, TIM broadcast response, and QoS map.

The above example partially illustrates the information that may be included in the association request/response frames, and additional information may be included therein.

After the STA is successfully associated with the network, the security setup process may be performed at step S540. The security setup process of the step S540 may be referred to as an authentication process through robust security network association (RSNA) request/response, the authentication process of the step S520 may be referred to as a first authentication process, and the security setup process of the step S540 may simply be referred to as an authentication process.

The security setup process of the step S540 may include, for example, performing private key setup through 4-way handshaking based on extensible authentication protocol over LAN (EAPOL). Also, the security setup process may be performed in accordance with a security scheme which is not defined in the IEEE 802.11 standard.

Figure 6:
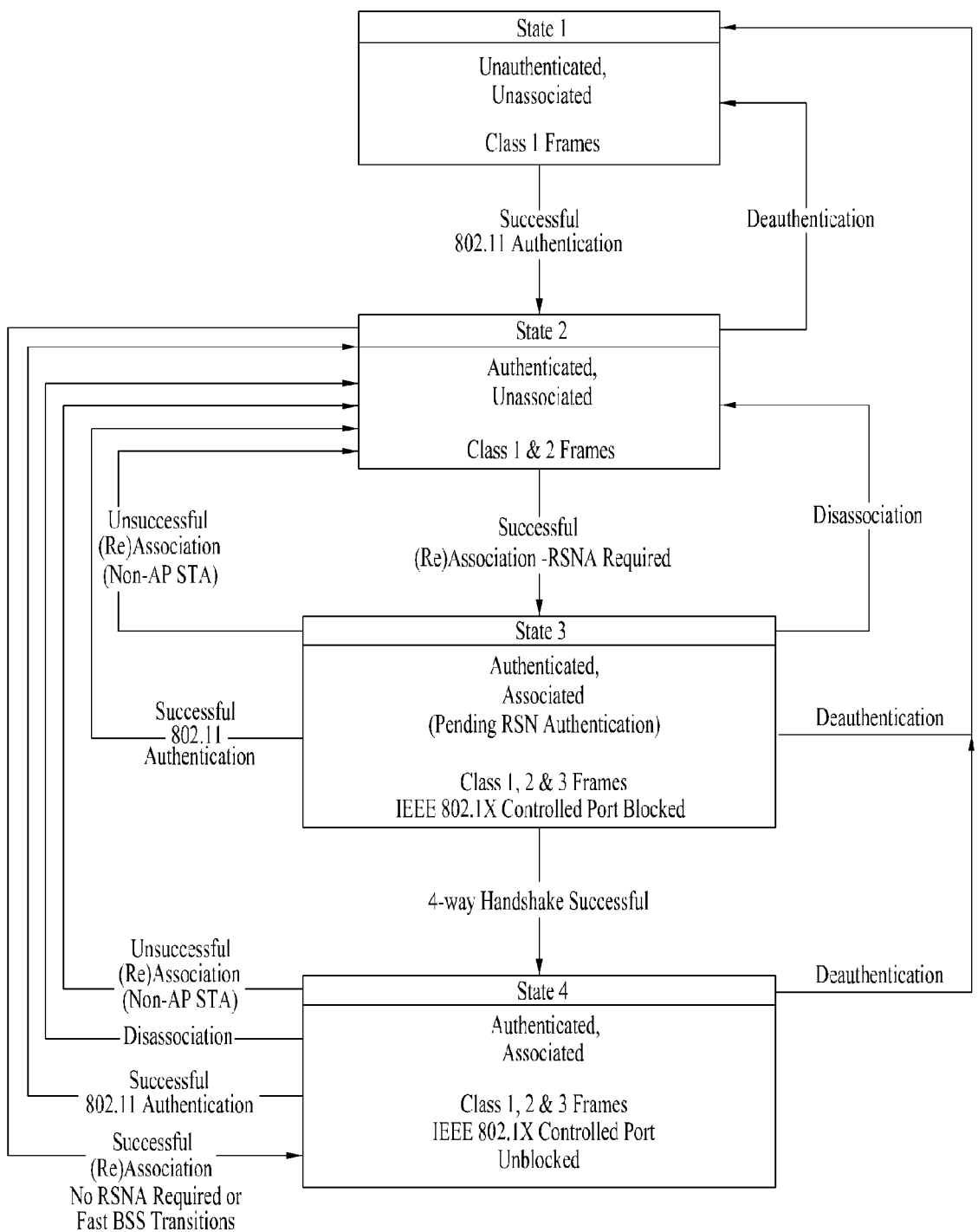
FIG. 6 is a diagram conceptionally illustrating state transition of STA.

FIG. 6 is a diagram conceptually illustrating state transition of STA. For clarification, FIG. 6 illustrates events only, which cause state change.

State 1 is the state that the STA is unauthenticated and unassociated. The STA of this state may transmit and receive class 1 frames only to and from another STA. The class 1 frame, for example, includes a management frame such as probe response/request frames, a beacon frame, an authentication frame, and a deauthentication frame.

If the STA of the state 1 is successfully authenticated (for example, authentication corresponding to S520 of FIG. 5), the STA is changed to state 2. In other words, the state 2 is authenticated but is not associated. The STA of this state may transmit and receive class 1 and 2 frames only to and from another STA. The class 2 frame, for example, includes a management frame such as association request/response frames, reassociation request/response frames, and a diassociation frame.

If the STA of the state 2 is diassociated, the STA again returns to the state 1. As the STA of the state 2 is successfully associated, if RSNA is not requested or in case of fast BSS transition, the STA is changed from the state 2 to state 4.

In the meantime, if the STA of the state 2 is successfully associated (or reassociated), the STA is changed to state 3. In other words, the state 3 is authenticated and associated, but its RSNA authentication (for example, security setup corresponding to S540 of FIG. 5) is not completely performed. Although the STA of this state may transmit class 1, 2 and 3 frames to and from another STA, its IEEE 802.1x control port is blocked. The class 3 frame includes a management frame such as a data frame and an action frame, and a control frame such as a block ACK frame, which are transmitted and received between the STAs within the infrastructure BSS.

If the STA of the is diassociated, or is not associated successfully, the STA returns to the state 2. If the STA of the state 3 is deauthenticated, the STA returns to the state 1.

If the STA of the state 3 performs 4-way handshaking, the STA is changed to state 4. The STA of the state 4 is authenticated and associated, may transmit class 1, 2 and 3 frames, and its IEEE 802.1x control port is unblocked.

If the STA of the state 4 is diasscoiated, or is not associated successfully, the STA returns to the state 2. If the STA of the state 4 is deauthenticated, the STA returns to the state 1.

Random Access Process in LTE/LTE-A System

In the LTE system, the user equipment may perform the random access process in case of the following events: i) in the event that the user equipment performs initial access due to no connection (for example, RRC connection) with the base station; ii) in the event that the user equipment initially accesses a target cell during a handover process; iii) in the event that the random access process is requested by a command of the base station; iv) in the event that uplink data occur in a state that uplink time advance is not synchronized or a designated radio resource is not allocated; and v) in the event that a recovery process is performed during radio link failure (RLF) or handover failure.

In the LTE system, the base station allocates a random access preamble dedicated for a specific user equipment, and the user equipment provides a non-contention based random access process for performing the random access process by using the random access preamble. In other words, the random access process is classified into a contention based random access process and a non-contention based random access process in accordance with a process of selecting the random access preamble. In the contention based random access process, the user equipment randomly selects one of a set of random access preambles and uses the selected one. In the non-contention based random access process, a random access preamble allocated from the base station to the specific user equipment only is used. The contention based random access process is different from the non-contention based random access process in occurrence of contention. The non-contention based random access process may be used only in case of request based on the handover process or the command of the base station.

First of all, an operation procedure of the user equipment and the base station in the contention based random access process will be described.

(1) Transmission of First Message (Msg1)

First of all, the user equipment may randomly select one random access preamble from a set of random access preambles indicated through system information or handover command, and may select a physical random access channel (PRACH) resource, through which the random access preamble may be transmitted, and transmit the selected resource.

(2) Reception of Second Message (Msg2)

After transmitting the random access preamble, the user equipment tries to receive its random access response within a random access receiving window indicated through the system information or handover command from the base station. In more detail, the random access response information may be transmitted in the form of MAC PDU (packet data unit). The MAC PDU may be transferred through a physical downlink shared channel (PDSCH). Also, in order to appropriately receive the information transferred through the PDSCH, it is preferable that the user equipment monitors a physical downlink control channel (PDCCH). In other words, it is preferable that the PDCCH includes information of the user equipment, which should receive the PDSCH, frequency and time information of a radio resource of the PDSCH, and a transmission format of the PDSCH.

Control information transmitted through the PDCCH will be referred to as downlink control information (DCI). The base station determines a PDCCH format depending on the DCI transmitted to the user equipment, and attaches cyclic redundancy check (CRC) to the control information. The CRC is masked with an identifier (for example, radio network temporary identifier (RNTI)) depending on owner or usage of the PDCCH. If the PDCCH is for a specific user equipment, the CRC may be masked with cell-RNTI (C-RNTI) of the corresponding user equipment. If the PDCCH is for a paging message, the CRC may be masked with a paging indicator identifier (P-RNTI). If the PDCCH is for system information, the CRC may be masked with system information RNTI (SI-RNTI). If the PDCCH is for a random access response of the user equipment, the CRC may be masked with random access RNTI (RA-RNTI).

Once the user equipment receives the PDCCH successfully, the user equipment may appropriately receive the random access response transmitted through the PDSCH in accordance with the information of the PDCCH. The random access response may include a random access preamble identifier (ID; for example, RAPID (random access preamble identifier)), uplink (UL) grant indicating uplink radio resources, a temporary cell identifier (temporary C-RNTI (Cell-Radio Network Temporary Identifier)), and time advance commands (TACs).

As described above, since random access response information for one or more user equipments may be included in one random access response, the random access preamble identifier is required for random access response to indicate a user equipment for which the UL grant, the temporary cell identifier and the TAC are valid. In this case, it is assumed that the user equipment selects a random access preamble identifier identical with the random access preamble selected.

(3) Transmission of Third Message (Msg3)

If the user equipment receives a random access response valid for itself, the user equipment processes each of various kinds of the information included in the random access preamble. In other words, the user equipment applies TAC and stores a temporary cell identifier. Also, the user equipment may store data, which will be transmitted in response to reception of the valid random access response, in a buffer for message 3.

In the meantime, the user equipment transmits data (that is, third message) to the base station by using the received UL grant. The third message should include the identifier of the user equipment. In case of the content based random access process, the base station cannot determine user equipments that perform the random access process. This is because that the base station should identify the user equipment to resolve contention later.

Two methods of including the identifier of the user equipment in the third message exist. The first method is that the user equipment having a valid cell identifier allocated from a corresponding cell before the random access process transmits its cell identifier through an uplink transmission signal corresponding to the UL grant. On the other hand, the user equipment which is not allocated with a valid cell identifier before the random access process transmits its unique identifier (for example, S-TMSI (S-Temporary Mobile Subscriber Identity) or random ID). Generally, the unique identifier is longer than the cell identifier. The user equipment which has transmitted the data corresponding to the UL grant initiates a contention resolution timer (hereinafter, referred to as "CR timer").

(4) Reception of Fourth Message (Msg4)

After the user equipment transmits the data including its identifier to the base station through the UL grant included in the random access response, the user equipment waits for a command of the base station to resolve contention. In other words, the user equipment tries to receive the PDCCH to receive a specific message. Two methods of receiving the PDCCH exist. As described above, if the identifier of the user equipment, which is included in the third message transmitted to correspond to the UL grant, is the cell identifier, the user equipment tries to receive the PDCCH by using its cell identifier. If the identifier of the user equipment is the unique identifier, the user equipment may try to receive the PDCCH by using the temporary cell identifier included in the random access response. Afterwards, in case of the former case, if the PDCCH is received through the cell identifier of the user equipment before the CR timer expires, the user equipment determines that the random access process has been performed normally, and ends the random access process. In case of the latter case, if the PDCCH is received through the temporary cell identifier before the CR timer expires, the user equipment identifies the data carried by the PDSCH indicated by the PDCCH. If the unique identifier of the user equipment is included in the data carried by the PDSCH, the user equipment determines that the random access process has been performed normally, and ends the random access process.

Meanwhile, unlike the aforementioned contention based random access process, in the non-contention based random access process, the random access process ends by means of only transmission of the first message and the second message. However, before the user equipment transmits the random access preamble to the base station as the first message, the user equipment is allocated with the random access preamble from the base station, and transmits the allocated random access preamble to the base station as the first message and receives the random access response from the base station, whereby the random access process ends.

The non-contention based random access process may be performed in case of a handover process or a request based on the command of the base station. Of course, the contention based random access process may be performed in case of these two cases.

For the non-contention based random access process, the user equipment is allocated with a dedicated random access preamble having no possibility of contention from the base station. The user equipment may be commanded the random access preamble from the base station through a handover command or a PDCCH command. The user equipment transmits its dedicated random access preamble, which is allocated from the base station, to the base station as the first message. The method of receiving the random access response information from the base station is the same as that in the contention based random access process.

Fast Link Setup

In a link setup scheme defined in the current wireless communication system (for example, WLAN system) described above, message exchange should be performed through beacon or probe request/response (that is, network discovery operation), authentication request/response (that is, first authentication operation), association request/response (that is, association operation), and RSNA request/response (that is, authentication operation).

This link setup process according to the related art accompanies great overhead (or information amount) and long latency in message exchange. For example, according to the link setup scheme of the related art, after the STA first establishes association with the AP, which enables association, regardless of the fact whether the AP may successfully provide data services, if the associated AP cannot provide the data services to the STA successfully, the corresponding STA tries association with another AP. In this case, the STA should perform the association operation several times as the case may be to receive the data services, great delay and message exchange overhead occur. Accordingly, in order to reduce such overhead and delay, it is preferable that the STA performs association with AP that may provide data services successfully.

Also, in the link setup process according to the related art, if link setup is performed for one AP by a plurality of users, the corresponding AP does not provide a method for appropriately distributing the plurality of users. Accordingly, if there are a number of stations (or users) that simultaneously initiate link setup, link setup cannot be operated efficiently.

Also, since the link setup process according to the related art is suitable for a station having low mobility and is designed to cause high message overhead and delay, the link setup process is not efficient for a station having high mobility. For example, since the station that moves at fast speed stays at coverage of a random AP for a very short time, the link setup process of the related art is not suitable for such a transient station. For example, after the STA transmits the association request frame to the AP, when the AP prepares the association response frame and then transmits the association response frame to the STA, the STA might already be out of the AP.

Accordingly, by correcting the aforementioned link setup process of the related art, the present invention suggests a new scheme for supporting fast link setup performed by each of a plurality of users substantially at the same time.

The embodiment 1 of the present invention may be referred to as an early admission control method. For example, the early admission control method may be regarded as the method for determining whether the AP will admit or grant STA, which has initiated the link setup process (for example, association process), on the basis of load which is expected. Early admission control is different from load element or call admission capacity element of the related art in that admission of the corresponding STA is determined considering load which is expected to be increased due to STAs which currently perform the association process.

The embodiment 2 of the present invention may be referred to as a concurrent association handling method. This method is intended to reduce contention overhead caused by concurrent messages occurring when a plurality of STAs initiate link setup (for example, association process). For example, comeback delay may be given to each of responses, which should be provided in response to the request of the STAs, before a subsequent request occurs. Comeback delay may be determined on the basis of the number (or expected number) of STAs which are performing the association process.

The embodiment 3 of the present invention may be referred to as a parallel active scanning method. For example, the STA may reduce the time required for network recovery by simultaneously performing active scanning (that is, probe request/response processes) for a plurality of channels. As a result, the AP may transmit the probe response to a random channel on another channel in the same manner as multi-band operation.

Hereinafter, the aforementioned embodiments of the present invention will be described in more detail.

Embodiment 1

The embodiment 1 relates to an early admission control method.

According to this embodiment, the STA may add quality of service (QoS) related information, which is expected to be used by the STA, to a request frame transmitted to the AP, so that the AP may predict load occurring during link setup with the STA. The QoS related information, which is expected to be used by the STA, may include information on a bandwidth which is expected to be used by the STA, or information on a data rate which is expected to be used by the STA. Hereinafter, this embodiment will be described based on "requested bandwidth" information as the QoS related information which is expected to be used by the STA. However, the scope of the present invention is not limited to the requested bandwidth information, and may include another type QoS related information.

The requested bandwidth information included in the request frame transmitted from the STA may have a value of a bandwidth which is expected to be used by the STA. The request frame that includes the request/expected bandwidth information may be an authentication request frame or an association request frame, for example. Preferably, the requested/expected bandwidth information may be included in the authentication request frame during the authentication process performed before the association process, whereby admission of the corresponding STA may early be determined.

After discovering the networks or APs through the scanning process, the STA may select (for example, select on the basis of signal-to-interference plus noise ratio (SINR) of the AP) a pertinent one of the discovered APs. The STA may transmit the request frame, which includes information on the requested/expected bandwidth, to the selected AP. If the AP receives the corresponding request frame, the AP may accept or reject the request from the STA on the basis of its expected available capacity (EAC).

Also, EAC of the AP may be updated whenever the request frame, which includes the requested/expected bandwidth information, is received. This is because that the request frame, which includes the requested/expected bandwidth information, indicates potential intention of the corresponding STA which desires to establish association with the AP. Considering that a number of STAs perform the link setup operation for the same AP at the almost same time, EAC of the AP is updated by only reception of the request frame regardless of final admission of authentication of the corresponding STA. For example, if EAC of AP1 is updated after it is determined whether STA1 will be served actually, a reference value, which determines whether the AP1 may support requested/expected bandwidth (that is, AC2) of STA2, becomes unclear, wherein the STA2 performs authentication request for the AP1 almost simultaneously with the STA1. Accordingly, AP1 may determine whether to support AC2 of another STA2 on the basis of a value of its EAC, which is reduced as much as AC1 (that is, requested/expected bandwidth of STA1), by potentially determining that the STA1 will be served, until it is finally determined that the corresponding STA1 is not a serving target. As a result, it is possible to prevent an error determined to be able to support the STA2.

Figure 7:
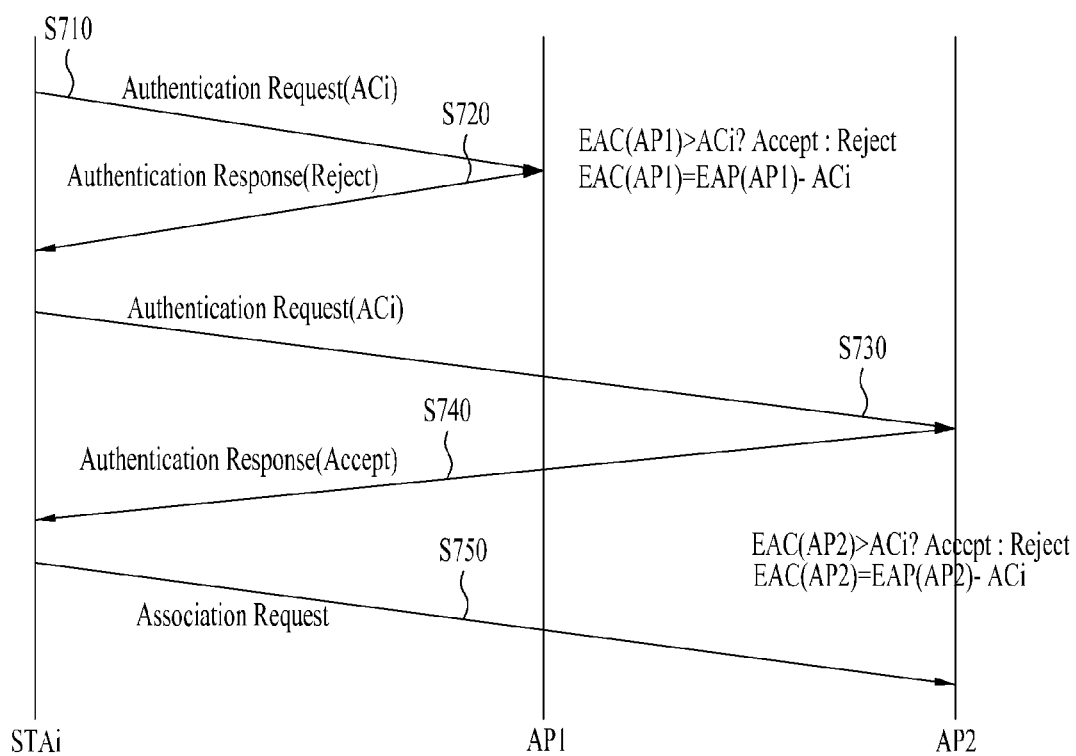
FIG. 7 is a diagram illustrating an example of an early admission control method according to the present invention.

FIG. 7 is a diagram illustrating an example of an early admission control method according to the present invention.

In the example of FIG. 7, an expected bandwidth requested by STAi is a size of ACi. When STAi transmits a request frame (for example, authentication request frame) to the AP to initiate link setup, ACi parameter may be added to the corresponding request frame. If the AP receives the request frame, the AP may determine whether its EAC is greater than ACi (that is, EAC>ACi), and may accept the request of the corresponding STA only if its EAC is greater than ACi. If EAC of the AP is less than ACi, the AP may reject the request of the corresponding STA. Alternatively, the AP may be operated to accept the corresponding request frame if EAC of the AP is greater than or equal to ACi which is the requested/expected bandwidth of the STA, and the AP may be operated to reject the corresponding request frame if EAC of the AP is smaller than ACi which is the requested/expected bandwidth of the STA. It is important that the AP is operated to accept the corresponding request only if it is determined that the AP may appropriately support the bandwidth equivalent to ACi by comparing EAC with ACi of the STA.

In the example of FIG. 7, STAi may transmit the authentication request frame, which includes ACi parameter for its requested/expected bandwidth, to the AP1 (S710). If EAC of the AP1 is not greater than ACi which is the requested/expected bandwidth of STAi (that is, EAC (AP1)>ACi is not satisfied), the AP1 may transmit the authentication response frame, which rejects the request of STAi (S720). The AP1 may compare its EAC (AP1) with ACi requested by the STAi, and may update its EAC (AP1). In other words, the AP1 may maintain a value, which is obtained by subtracting ACi from its previous EAC (AP1), as the updated EAC (AP1). At step S720, STAi which has received the rejection message may transmit the authentication request frame, which includes ACi parameter for its requested/expected bandwidth, to another AP, that is, AP2 without performing a subsequent process (for example, transmission of association request frame) for the AP1 (S730). In this case, it is assumed that the AP2 is one of APs determined through the network discovery process of the STAi. If EAC of the AP2 is greater than ACi which is the requested/expected bandwidth of the STAi (that is, EAC (AP2)>ACi is satisfied), the AP2 may transmit the authentication response frame, which accepts the request of the STAi (S740). The AP2 may compare its EAC (AP2) with ACi requested by the STAi, and may maintain a value, which is obtained by subtracting ACi from its previous EAC (AP2), as the updated EAC (AP2). At step S740, the STAi which has received the accept message may perform transmission of the association request frame for the AP2 as the subsequent process (S750).

If the AP1 determines that authentication of the STAi is accepted in the same manner as the related art without considering whether to support ACi bandwidth requested by the STAi, the AP determines that it cannot support the corresponding STAi during a subsequent process (for example, serving request process of the STAi after link setup is completed), and notifies the STAi of the determined result, whereby unnecessary message overhead and delay occur. According to the present invention, at the initial step (for example, authentication process) of link setup, the expected bandwidth requested by the corresponding STAi is compared with supportable available capacity of the AP, whereby acceptance or rejection of the corresponding STAi is determined, and as a result, overhead of unnecessary message exchange may be reduced. The AP that cannot support the requested bandwidth of the STAi may notify the STAi of it as soon as possible, whereby the corresponding STAi may initiate link setup for another AP. As a result, efficiency in use of resources is increased in view of the overall network, and at the same time fast link setup may be performed in view of the STA.

Also, this example may favorably be applied to the case where a plurality of link setup processes exist in parallel at the same time. For example, the STAi may transmit authentication request (authentication request including ACi parameter) to a random AP to each of a plurality of APs at the almost same time or without waiting for a response from another AP, and may initiate the association process for the AP(s) that has (have) transmitted the response frame that accepts the authentication request. Finally, if there are provided a plurality of APs, which accept association, the STAi may establish association for a pertinent AP (for example, AP having the highest SINR) determined in accordance with priority based on a predetermined reference.

According to this embodiment 1, the requested/expected bandwidth (ACi) may be added to the authentication request frame or the association request frame as a new field. Also, an indicator indicating accept/reject for the corresponding requested/expected bandwidth may be added to the authentication response frame or the association authentication frame as a new field. Table 2 exemplarily illustrates a format of the authentication frame corrected in accordance with the example of the present invention.

TABLE 2

| Order | Information | Notes |
|-------|-------------|-------|
| 1 | Authentication algorithm number | |
| 2 | Authentication transaction sequence number | |
| 3 | Status code | The status code information is reserved in certain Authentication frames. |
| 4 | Challenge text | The challenge text element is present only in certain Authentication frames. |
| 5 | RSN | The RSNE is present in the FT Authentication frames. |
| 6 | Mobility Domain | The MDE is present in the FT Authentication frames. |
| 7 | Fast BSS Transition | An FTE is present in the FT Authentication frames. |
| 8 | Timeout Interval (reassociation deadline) | A Timeout Interval element (TIE) containing the reassociation deadline interval is present in the FT Authentication frames. |
| 9 | RIC | A Resource Information Container, containing a variable number of elements, is present in the FT Authentication frames. |
| 10 | Finite Cyclic Group | An unsigned integer indicating a finite cyclic group. This is present in SAE authentication frames |
| 11 | Anti-Clogging Token | A random bit-string used for anti-clogging purposes. This is present in SAE authentication frames. |
| 12 | Send-Confirm | A binary encoding of an integer used for anti-replay purposes. This is present in SAE authentication frames |
| 13 | Scalar | An unsigned integer encoded. This is present in SAE authentication frames |
| 14 | Element | A field element from a finite field encoded. This is present in SAE authentication frames |
| 15 | Confirm | An unsigned integer encoded. This is present in SAE authentication frames |
| 16 | Request Bandwidth | An unsigned integer to represent expected bandwidth that this station may use after the setup. |
| Last | Vendor Specific | One or more vendor-specific elements are optionally present. These elements follow all other elements. |

In Table 2, a request bandwidth may be added as the sixth field (or element). A value of the request bandwidth field may have an unsigned integer value which may indicate a bandwidth value expected to be used by the corresponding STA after link setup.

Also, in Table 2, a value indicating a cause of authentication rejection (or failure) may additionally be defined in a status code which is the third field. For example, a value REFUSED_REASON_EAC_FAILED may additionally be defined in a status code value range. Since EAC is satisfied if authentication is successfully performed, a separate value such as success may additionally be defined. However, if authentication is accepted, since it may imply that EAC satisfies the requested/expected bandwidth of the STA, it is not essentially required that a separate value is defined.

Similarly to the above example, information on the requested/expected bandwidth of the STA may be included in the association request frame, and the value indicating that association failure is caused as EAC is not satisfied may be defined in the association response frame.

Embodiment 2

This embodiment 2 relates to a concurrent association handling method.

For example, if a plurality of STAs initiate link setup at the same time, a number of request frames may be transmitted to one AP at the almost same time. In this case, load of the AP that processes a number of request frames within a short time may be increased. For example, if the STA1 and the STA2 transmit the authentication request frame to the AP at the almost same time and receives the authentication response frame at the almost same time, since the STA1 and the STA2 are likely to transmit the association request frame at the almost same time, congestion continues to occur within the network during the link setup process. In some case, even though the STA1 transmits the association request frame to the AP after receiving the authentication response frame from the AP, the AP processes the authentication request/association request of other STAs, so the AP may fail to process the association request of the STA1, whereby the STA1 may not receive the association response frame. Even though the STA1 may normally be associated with the AP in case of no congestion, if many messages continue to be transmitted to the AP at one time, a problem occurs in that the STA1 is not associated with the AP.

According to this embodiment, in order to efficiently process concurrent (or successive) multiple request messages, "comeback delay" may be added to the response message to each request message. As a result, since a subsequent operation at each STA, which is initiated in accordance with the response message, may be performed after a randomized time, congestion caused by message transmission of the plurality of STAs may be prevented from occurring.

Figure 8:
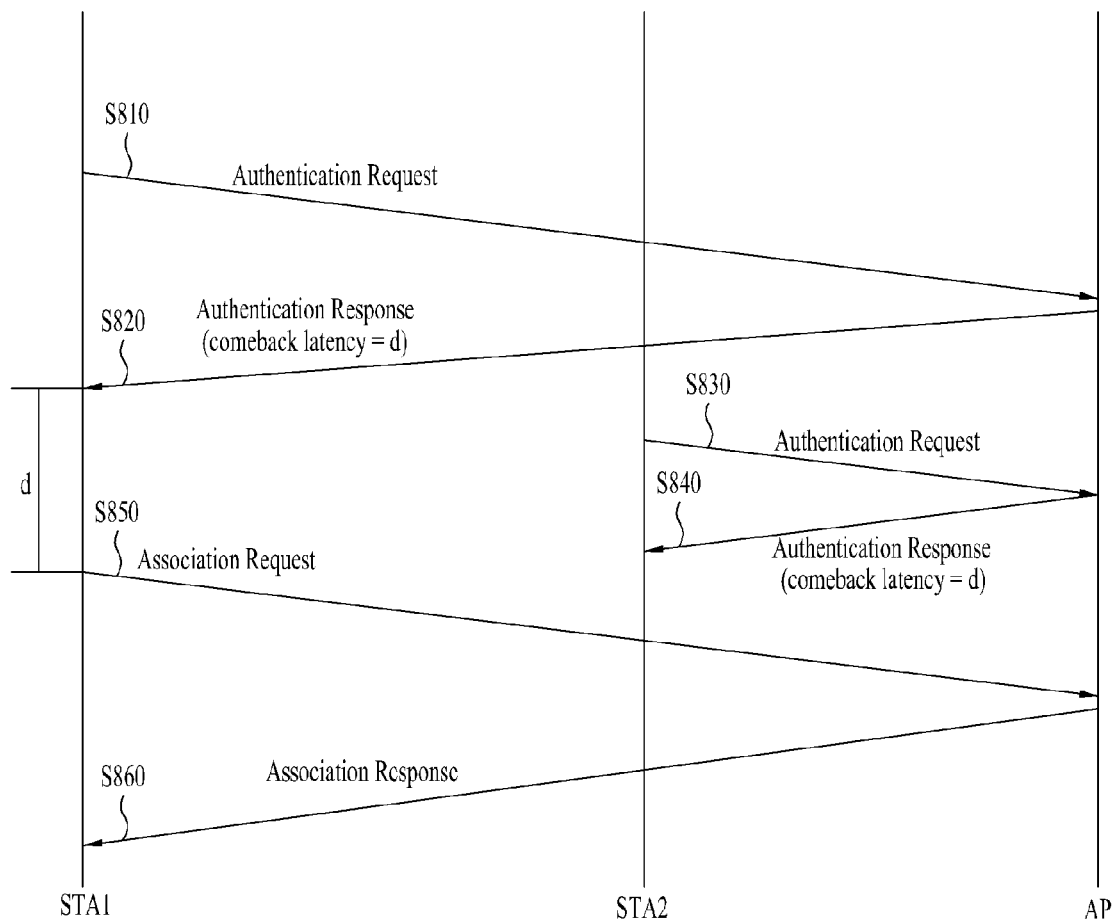
FIG. 8 is a diagram illustrating an example of a concurrent association handling method according to the present invention.

FIG. 8 is a diagram illustrating an example of a concurrent association handling method according to the present invention.

At step S810, the STA may transmit the authentication request message to the AP, and may receive the authentication response message from the AP in response to the authentication request message at step S820. The authentication request message of the step S810 may include QoS related information (for example, requested/expected bandwidth information) of the embodiment 1, and the authentication response message of the step S820 may include information indicating acceptance/rejection for the QoS related information of the STA.

If comeback delay information is not included in the authentication response message of the step S820 in the same manner as the related art, the STA1 that has received the authentication response message may immediately perform the subsequent operation (for example, transmission of the association request message in case of acceptance and retransmission of the authentication request message in case of rejection at step S820). In this case, subsequent message transmission of the STA1, and transmission of the authentication request message of the STA2 at step S830 may be performed at the same time. If this operation is accepted, the request messages from multiple STAs may not be processed normally due to limitation of processing capability of the AP. For example, even though the STA1 transmits the association request message immediately after receiving the authentication response message, this association request may not be processed normally. Under the circumstances, transmission of the request message may increase load of the AP and congestion.

According to this embodiment, comeback delay information may additionally be included in the authentication response message of the step S820. For example, a value of comeback delay may be 'd'. As a result, the STA1 performs the subsequent operation (for example, transmission of the association request message in case of acceptance at step S820) after wait for a time length of 'd' from the time when the response message of the step S820 is received. In other words, if the time when the STA1 extracts comeback delay information included in the step S820 is the current time, the STA1 may perform the subsequent operation of the step S850 after wait for [d−[current time− time when the AP transmits message]]. For example, at step S850, the STA1 may transmit the association request message to the AP, and may receive the association response message from the AP in response to the association request message at step S860.

In the meantime, the STA2 may normally perform transmission (step S830) of the authentication request message and reception (step S840) of the authentication response message for the AP for a comeback delay time set by the AP for the STA1. Also, the AP may set comeback delay for the STA2 at step S840. Comeback delay for the STA1 may be the same as or different from that for the STA2. For example, comeback delay for each STA may be given as a random value. Accordingly, the initiation time of the subsequent operation (for example, transmission of the association request message) of each STA may be randomized or distributed.

Also, the AP may set comeback delay for each STA by considering a current level of congestion. For example, if current congestion is more than a predetermined threshold value, the AP may set a comeback delay value of 'd' to a value not 0 for the STAs that transmit the request message. If current congestion is less than a predetermined threshold value, the AP may not set a comeback delay value or set 'd=0', whereby each STA may immediately perform the subsequent operation.

For the operation of this embodiment described above, a new information element may be added to the response message (for example, authentication response message or association response message) transmitted from the AP to the STA, as illustrated in Table 3 below.

TABLE 3

| Element ID | Come back delay |
|---|---|
| (come back delay element ID = 175) | (unsigned integer to time in μsec) |

In Table 3, the element ID may have a previously defined value (for example, 175) indicating that the corresponding information element is a comeback delay element. Also, A value of a comeback delay field is an unsigned integer and may be given in a unit of μsec.

In the meantime, comeback delay provided through the authentication/association response messages according to this embodiment should be identified from a backoff timer provided through a probe response frame of active scanning at the network discovery step. Comeback delay in this embodiment may be determined on the basis of the number (or expected number) of STAs which are performing the association process, and is given at a time length longer than that of the backoff timer applied to the scanning operation so as to distribute the concurrent request messages from the plurality of STAs. In other words, since the backoff timer applied to the scanning operation is given at a time length very shorter than comeback delay of this embodiment, it is difficult to distribute the concurrent request messages of the plurality of STAs unlike the present invention.

Embodiment 3

This embodiment 3 relates to a parallel active scanning method.

According to the active scanning method of the related art, the STA that has finished probe request transmission and probe response reception on a random channel (for example, channel 1) is switched to another channel (for example, channel 2) and is operated to perform probe request transmission and probe response reception on the switched channel (for example, channel 2). In other words, active scanning of the related art accompanies time delay related to channel switching of the STA.

In the present invention, load of channel switching performed when the STA performs active scanning is partially given to the AP (in this case, it is assumed that the AP may perform channel switching more easily than the STA). Accordingly, the present invention suggests a method for performing a faster network discovery operation during a link setup process.

According to this embodiment, the STA may transmit a probe request frame on each of a plurality of channels and receive probe response frames on a predetermined channel (for example, channel for receiving a probe response frame) in response to the probe request frame. As a result, the time required for the plurality of channels may be more reduced than that required for the active scanning scheme of the related art, and load of channel switching of the STA may be reduced.

To this end, when the STA transmits the probe request frame, information on the channel (hereinafter, referred to as CHw) which will receive the probe response frame and information on time delay (hereinafter, referred to as response delay (RespDelay) which will be applied by the AP to transmission of the probe response frame may additionally be included in the probe request frame. CHw may be defined as a reserved channel for receiving the probe response frame.

Figure 9:
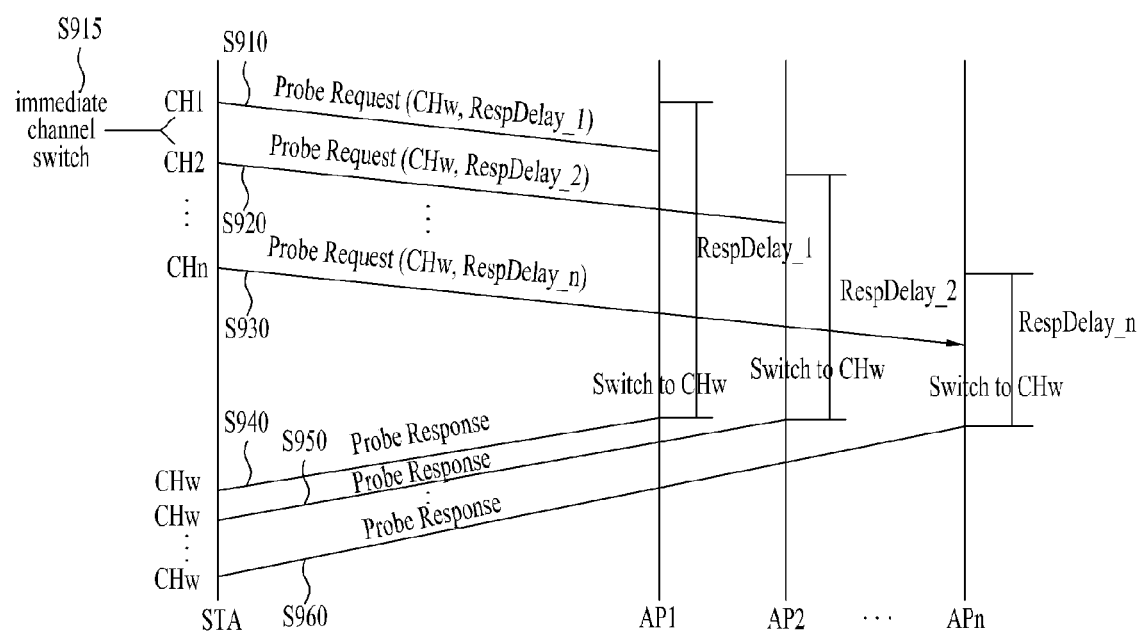
FIG. 9 is a diagram illustrating a parallel active scanning method according to the present invention.

FIG. 9 is a diagram illustrating a parallel active scanning method according to the present invention.

At step S910, the STA may transmit the probe request frame to the AP1 on the channel 1 (CH1), wherein the probe request frame may include CHw and response delay information (ResDelay_1). Afterwards, the STA immediately performs channel switching to CH2 at step S915 without wait for or receiving the probe response frame on CH1. At step S920, the STA may transmit the probe request frame, which includes CHw and response delay information (RespDelay_2), to the AP2 on the CH2. Similarly, channel switching and probe request frame transmission may be performed to reach CHn (steps S920 to S930).

At step S940, the STA may receive the probe response frame from the AP1 on the CHw. This corresponds to the response to the probe request frame transmitted from the STA to the AP1 on the CH1 at step S910 but is different from the active scanning scheme of the related art in that the probe response frame is received on the CHw not the CH1. The probe response frame received on the CHw may include information indicating the probe response frame on the channel (that is, CH1) to which the STA has transmitted the probe request frame. Also, the AP1 transmits the probe response frame of the step S940 on the CHw after wait for the time equivalent to response delay RespDelay_1 included in the probe request frame of the step S910. Likewise, even at the steps S950 and 960, the AP2 and APn may transmit each probe response frame to the STA on the CH2 after wait for a predetermined time on the basis of response delay information. In this case, values of RespDealy_1, RespDealy_2, . . . , RespDealy_n may be set to AP1, AP2, . . . , APn, whereby AP1, AP2, . . . , APn may transmit the probe response frame to the STA substantially at the same time. As a result, since the STA may intensively receive a plurality of probe response frames within a very short time, a probe response frame wait time of the STA may be reduced remarkably.

Although the common channel CHw and response delay RespDelay are applied to the probe request/response operation in the following description as a main example, the scope of the present invention is not limited to the above example, and the common channel CHw and response delay RespDelay may be applied to various message exchanges between the STA and APs (or set of STAs). For example, even in case that the STA transmits requests (for example, measurement request) related to each of a plurality of channels and desires to collect responses to the corresponding requests on a specific frequency at a specific time, information on a specific channel CHw and information on response delay RespDelay as suggested in the present invention may be included in the request message.

A new information element as illustrated in Table 4 below may be added to the request message (for example, probe request message) transmitted from the STA, whereby the operation of this embodiment may be performed.

TABLE 4

| Element ID (parallel active scan element ID = 176) | CHw (channel number where the station is expecting to receive the responses) | RespDelay (latency that the responder shall wait before issuing the response starting the transmission time of the request packet) |
|---|---|---|

In Table 3, element ID may have a previously defined value (for example, 176) indicating that the corresponding information element is the element that includes information related to parallel active scanning.

A value of a CHw field may indicate a channel number where the station expects to receive response frames.

A value of a RespDelay field may be given by a value indicating a time length from the transmission time (for example, the time when the STA transmits the request frame to the AP) of the request frame to the time when the STA initiates transmission of the response frame. For example, as shown in FIG. 9, the AP1 may transmit the probe response frame to the STA on the CHw after wait for a predetermined time length RespDelay_1 on the basis of the time when the STA transmits the probe request frame on the CH1.

In respect of RespDelay, to minimize ambiguity of time, the value of RespDelay may be determined and filled just before the PHY layer actually transmits the request packet. For example, supposing that the initial value set by the MAC layer as RespDelay is referred to as RespDelay_Org and delay required for the PHY layer to actually transmit the packet after the MAC layer generates the packet is referred to as residence delay Rd, a final value of RespDelay may be filled as [RespDelay_Org−Rd].

Also, this embodiment may consider the example performed on the MAC layer or the PHY layer. In case of the example performed on the MAC layer, a plurality of MAC request frames may be generated and transmitted on a plurality of frequencies (or channels). In this case, RespDelay should be updated for each request packet, whereby all the response frames may be received at the almost same time and the reception wait time of the STA may be minimized. Also, in case of the example performed on the PHY layer, one MAC request frame may be generated, and each of copies of the request frame may be transmitted on each channel. In this case, RespDelay at the copy of each request frame may appropriately be set by the PHY layer.

Also, as described above, the response message (for example, probe response frame) to various channels, which is transmitted on a specific channel (for example, CHw), may be shared among the plurality of STAs, whereby delay required for network discovery under the status that the plurality of STAs attempt link setup at the same time may be reduced. For example, the STA, which has transmitted the probe request frame, and the other STA may receive the probe response frame to various channels on the corresponding channel (for example, CHw) and use the received probe response frame in previously determining its scanning channel.

Also, even in case of passive scanning in accordance with extension of this embodiment, the STA may be operated to listen to the beacon frame from several APs on a channel (for example, CHw) for listening to a beacon without listening to the beacon frame while switching a channel. Even in this case, each AP may broadcast the beacon frame on the CHw in addition to broadcasting the beacon frame on its action channel. Also, each AP may include information, which allows the STA to know what the action channel of the AP is, in the beacon frame transmitted on the CHw.

Embodiment 4

This embodiment 4 relates to a method for performing fast initial access or link setup in a 3GPP LTE/LTE-A based wireless communication system when a user equipment performs initial access due to a non-connection (for example, RRC connection) with a base station.

For example, if LTE/LTE-A based small cells of which cell coverage is small are concentrated, the principle of the present invention may be applied to such small cells. For example, the random access process may start as the user equipment transmits a random access preamble to the base station. In this case, the user equipment may select one of random access preambles classified in accordance with a predetermined reference and then transmit the selected random access preamble (that is, Msg1).

In more detail, the random access preambles may be grouped in accordance with QoS related information (for example, request bandwidth (see embodiment 1)). For example, the random access preambles may be classified into three groups in accordance with a bandwidth requested from the user or reliability. For example, three groups may previously set in such a manner that group 1 indicates that the QoS related information requested from the user is related to low bandwidth or high reliability, group 2 indicates that the QoS related information requested from the user is related to middle bandwidth or reliability of middle level, and group 3 indicates that the QoS related information requested from the user is related to high bandwidth or reliability of low level.

The base station may determine a group to which the preamble selected by and transmitted from the user equipment belongs, and may estimate the QoS related information (for example, bandwidth request) requested from the user equipment.

If the base station may support the bandwidth requested from the corresponding user equipment, the base station may transmit the random access response (that is, Msg 2) by using the first identifier of the user equipment. For example, the base station may transmit the random access response through the PDSCH indicated by the PDCCH masked with RA-RNTI. As a result, the user equipment may complete initial access or link setup by transmitting Msg3 to the base station by using uplink grant provided by the base station in accordance with the random access response and performing the other random access process.

If the base station cannot support the bandwidth requested from the corresponding user equipment (or if a predetermined condition related to the corresponding requested bandwidth is not satisfied), the base station may transmit the random access response by using the second identifier of the user equipment. For example, the PDCCH masked with RA_NACK-RNTI different from RA-RNTI used for transmission of the random access response according to the related art may be transmitted as the random access response. In this case, although the PDSCH indicated by the corresponding PDCCH may be transmitted together with the PDCCH, since the base station does not grant random access of the user equipment as the bandwidth request of the user equipment is not satisfied, the PDSCH may not include uplink grant for Msg3 transmission of the user equipment. The user equipment that has received Msg2 by using RA_NACK-RNTI may know that its requested bandwidth is not accepted by the base station, and may early end the random access process.

In this case, RN_NACK-RNTI may be set in accordance with a predetermined rule on the basis of the existing RA-RNTI (for example, RA-RNTI used by the base station for Msg2 transmission if the bandwidth request of the user equipment is accepted in the above example). For example, RA_NACK-RNTI=RA-RNTI+c (c is a constant, for example, 1) may previously be set.

Also, the same RA-RNTI may be used for the case where the bandwidth request of the user equipment is accepted and the case where the bandwidth request of the user equipment is not accepted, and a method for identifying the case where the bandwidth request is accepted from the case where the bandwidth request is not accepted, by using a part of fields of DCI of the PDCCH of the random access response (that is, Msg2) may be used. For example, one or more of a resource block allocation field and MSC field of the fields of the PDCCH of Msg2 may be used to indicate whether to accept the bandwidth request of the user equipment. For example, if the bandwidth request of the user equipment is accepted, one or more of the resource block allocation field and the MSC field may be filled with 0 (zero). If the bandwidth request of the user equipment is accepted, the resource block allocation field or the MSC field may be filled with an appropriate value for PDSCH transmission indicated by the PDCCH masked with RA-RNTI.

Also, if serving cells exceeding one are configured for the user equipment, the serving cell to which the base station transmits the random access response may previously be defined when the bandwidth request of the user equipment is not accepted during the random access process. For example, if the random access response is received from the serving cell having the lowest index among the plurality of serving cells configured for the user equipment, the user equipment may regard that the corresponding random access response indicates that the bandwidth request is not accepted by the base station.

The descriptions in the aforementioned embodiments of the present invention may independently be applied to the method for fast link setup according to the present invention, or two or more of the aforementioned embodiments may simultaneously be applied to the method for fast link setup according to the present invention. The repeated description will be omitted for clarification.

Figure 10:
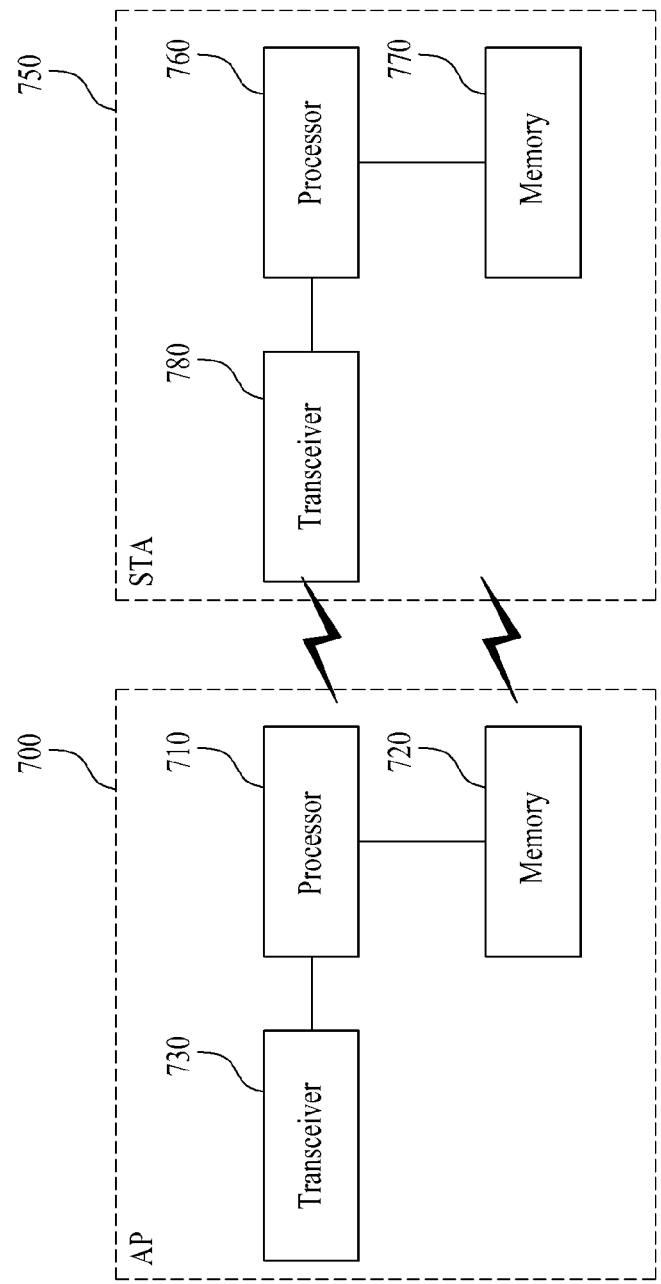
FIG. 10 is a block diagram illustrating an exemplary structure of AP and STA according to one embodiment of the present invention.

FIG. 10 is a block diagram illustrating an exemplary structure of AP (or base station) and STA (or user equipment) according to one embodiment of the present invention.

The AP 700 may include a processor 710, a memory 720, and a transceiver 730. The STA 750 may include a processor 760, a memory 770, and a transceiver 780.

Each of the transceivers 730 and 780 may transmit and receive a radio signal, and may obtain a physical layer based on the IEEE 802 system, for example.

Each of the processors 710 and 760 is connected with each of the transceivers 730 and 760, whereby the physical layer and/or MAC layer based on the IEEE 802 system may be obtained. The processors 710 and 760 may be configured to perform the early admission control method, the concurrent association handling method and/or the parallel active scanning method according to various embodiments of the present invention.

Also, modules that implement the operations of the AP and the STA according to the aforementioned embodiments of the present invention may be stored in the memories 720 and 770, and may be implemented by the processors 710 and 760. The memories 720 and 770 may be provided inside or outside the processors 710 and 760 and may be connected with the processors 710 and 760 by a known means.

The description of the aforementioned AP 700 and STA 750 may be applied to each of the base station and the user equipment in another wireless communication system (for example, LTE/LTE-A system).

The descriptions in the aforementioned embodiments of the present invention may independently be applied to the detailed configuration of the AP and the STA, or two or more of the aforementioned embodiments may simultaneously be applied to the detailed configuration of the AP and the STA. The repeated description will be omitted for clarification.

The aforementioned embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc If the embodiments according to the present invention are implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The structures of the processors 710 and 760 of the AP and the STA will be described in more detail.

Figure 11:
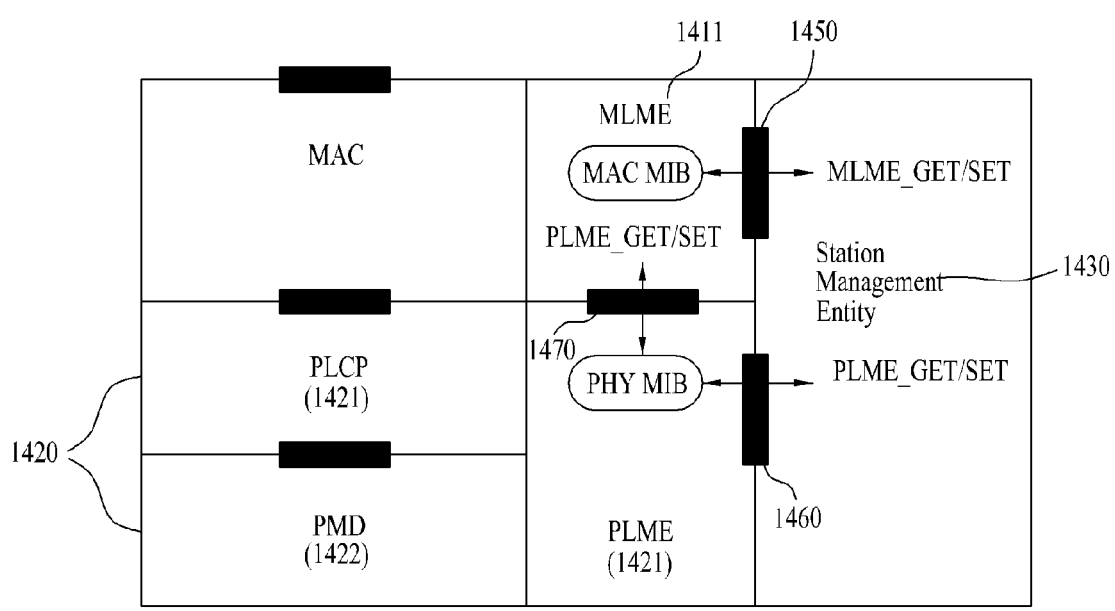
FIG. 11 is a diagram illustrating an exemplary structure of processors of AP and STA according to one embodiment of the present invention.

FIG. 11 is a diagram illustrating an exemplary structure of processors of AP and STA according to one embodiment of the present invention.

The processor 710 or 760 of the AP or the STA of FIG. 10 may have a structure of a plurality of layers, and FIG. 11 illustrates a MAC sublayer 1410 and a physical (PHY) layer 1420 on a data link layer (DLL) of the plurality of layers. As shown in FIG. 11, the PHY layer 1420 may include a physical layer convergence procedure (PLCP) entity 1421 and a physical medium dependent (PMD) entity 1422. Each of the MAC sublayer 1410 and the PHY layer 1420 includes a management entity referred to as a MAC sublayer management entity (MLME) 1411. These entities 1411 and 1421 provide layer management service interface of which layer management function is operated.

For exact MAC operation, a station management entity (SME) 1430 exists within each STA. The SME 1430 is a layer independent entity that exists in a separate management plane or off to the side. Although exact functions of the SME 1430 will not be described in detail herein, this entity 1430 may generally collect layer-dependent state from various layer management entities (LMEs) and have the role of setting values of layer-specific parameters similarly to one another. The SME 1430 may perform these functions on behalf of the general system management entity and implement a standard management protocol.

The entities shown in FIG. 11 interact with one another in various manners. FIG. 11 illustrates some examples of exchange of GET/SET primitives. XX-GET.request primitive is used to request a value of a given MIB attribute (management information based attribute information). XX-GET.confirm primitive is used to return pertinent MIB attribute information value if Status is "success", and is used to return error indication to a Status field if not so. XX-SET.request primitive is used to request that indicated MIB attribute is set to a given value. If the MIB attribute means a specific operation, it requests that the corresponding operation should be performed. XX-SET.confirm primitive is used to confirm that indicated MIB attribute is set to a requested value if Status is "success" and is used to return a error condition to the Status field if not so. If the MIB attribute means a specific operation, it confirms that the corresponding operation has been performed.

As shown in FIG. 11, the MLME 1411 and the SME 1430 may exchange various MLME GET/SET primitives with each other through MLME SAP 1450. Also, as shown in FIG. 11, various PLCM_GET/SET primitives may be exchanged between the PLME 1421 and the SME 1430 through PLME_SAP 1460, and may be exchanged between the MLME 1411 and the PLME 1470 through MLME-PLME_SAP 1470.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments of the present invention have been described based on the IEEE 802.11 system but may be applied to various mobile communication systems in the same manner.

The invention claimed is:
1. A method for an access point (AP) to perform an association process in a wireless communication system, the method comprising:
receiving, from a plurality of stations (STAs) not associated with the AP, authentication request frames, each of the authentication request frames including request bandwidth related information and authentication information of a corresponding STA ; transmitting, to the plurality of STAs, authentication response frames, each of the authentication response frames including information indicating a corresponding STA' s authentication request frame acceptance , wherein the corresponding STA' s authentication request frame acceptance is determined by the AP based on the authentication information of the corresponding STA and based on a comparison between a corresponding expected available AP capacity and the request bandwidth related information of the corresponding STA, and wherein each of authentication response frames includes comeback delay information for the corresponding STA; and initiating the association process with a specific STA of the plurality of STAs based on the comeback delay information of the specific STA, wherein the specific STA is determined by one of the plurality of STAs, wherein the comeback delay information is determined based on a number of the plurality of STAs performing the association process.

2. The method according to claim 1, further comprising:
updating the corresponding expected available capacity based on the request bandwidth related information of the specific STA.

3. The method according to claim 1, further comprising: after the association process is initiated, receiving an additional request frame from a STA other than the specific STA after the a STA other than the specific STA waits for a wait time indicated by the comeback delay information of the STA other than the specific STA.

4. The method according to claim 3, wherein the wait time is set to a value obtained by subtracting difference between a current time and a time when the authentication response frame of the STA other than the specific STA is transmitted from the AP from a value of the comeback delay information of the STA other than the specific STA.

5. The method according to claim 1,
wherein the authentication request frames are received on a plurality of respective channels, and
wherein the authentication response frames are transmitted on one channel.

6. The method according to claim 5, wherein each of the plurality of authentication request frames further includes information on the one channel.

7. The method according to claim 5, wherein each of the plurality of authentication request frames further includes information on a corresponding STA's authentication response frame's wait time.

8. The method according to claim 7, wherein the corresponding STA's authentication response frame's wait time is set to a value that allows the corresponding STA to transmit the corresponding authentication response frame for a predetermined time interval.

9. An access point (AP) device for performing an association process in a wireless communication system, the AP device comprising:

a transceiver performing communication with an external device; and a processor controlling the AP device that includes the transceiver, wherein the processor is configured to:
receive, from a plurality of stations (STAs) not associated with the AP, authentication request frames, each of the authentication request frames including request bandwidth related information and authentication information of a corresponding STA;

transmitting, to the plurality of STAs, authentication response frames, each of the authentication response frames including information indicating a corresponding STA's authentication request frame acceptance, wherein the corresponding STA's authentication request frame acceptance is determined by the AP based on the authentication information of the corresponding STA and based on a comparison between a corresponding expected available AP capacity and the request bandwidth related information of the corresponding STA, and wherein each of authentication response frames includes comeback delay information for the corresponding STA; and initiate the association process with a specific STA of the plurality of STAs based on the comeback delay information of the specific STA, wherein the specific STA is determined by one of the plurality of STAs, wherein the comeback delay information is determined based on a number of the plurality of STAs performing the association process.

* * * * *